2,904,469

STABILIZED AQUEOUS SUSPENSION OF SALICYLAMIDE

Wilson Nashed, New Brunswick, N.J., assignor to Johnson & Johnson, a corporation of New Jersey No Drawing. Application July 29, 1957
Serial No. 674,570

4 Claims. (Cl. 167—65)

This invention relates to stable aqueous suspensions of finely divided solid salicylamide, and to methods for the preparation thereof. More particularly, it relates to such suspensions containing an aqueous solution of polyvinylpyrrolidone and an aqueous sugar syrup having a specific gravity of 1.339.

In the oral administration of salicylamide medication various liquid media have been proposed heretofore. However, so far as known, all of such materials suffer from various disadvantages. A desirable form for such compositions is an aqueous suspension in a sugar or the like medium having a pleasant taste. However, it has been found by actual test that many of such suspensions prepared in conventional manner suffer from the drawback of instability; i.e., they tend to separate on standing giving a product which is highly undesirable.

The discoveries associated with the invention and relating to solutions of the above problems, and the objects achieved in accordance with the invention as set forth herein include: the provision of a method of preparing a stable aqueous suspension containing 2 to 15 percent by weight of finely divided solid salicylamide in an aqueous vehicle by preparing a paste of the solid in an aqueous solution containing at least 0.02% by weight (of the final suspension) of polyvinylpyrrolidone and thoroughly mixing this paste with an aqueous sugar syrup having a specific gravity in the range of 1.335 to 1.340 and the resulting stable product; the provision of such a method wherein the polyvinylpyrrolidone has a molecular weight of about 40,000 and the sugar solution contains sucrose and sorbitol in a weight ratio of about three parts of the sucrose to one part of sorbitol, and the resulting product contains 4 to 5 percent by weight of salicylamide; and other objects which will be apparent as details or embodiments of the invention are set forth hereinafter.

In order to facilitate a clear understanding of the invention, the following preferred specific embodiments are described in detail.

A solution is prepared having the following composition:

| | Parts by weight |
|---|---|
| Sucrose | 40 |
| Water | 17.5 |
| Sorbitol (as 70% aqueous mixture) | 18.5 | and this solution is mixed with finely divided salicylamide (particle size or average diameter of about 3 to 4 microns) in the following proportions:

| | Parts by weight |
|---|---|
| Salicylamide | 325 |
| Solution | 6,340 |

In preparing the mixture, the salicylamide is mixed with a small portion of the solution to form a paste, and this paste is then blended with the remainder of the solution with thorough mixing or kneading followed by passage through a colloid mill or homogenizer.

Stability test

The stability of the resulting composition is tested by allowing it to stand for about 15 hours or more, and then testing the product for homogeneity. For a satisfactory product, there should be no separation of the salicylamide.

In accordance with the invention, just prior to or simultaneously with forming the paste, the salicylamide is mixed with an aqueous solution of polyvinylpyrrolidone having a molecular weight of about 40,000 in the following proportions (wherein the relationship of weight to volume is the same as grams to cubic centimeters):

Concentration of polyvinylpyrrolidone
(in final composition)

Example:
1 _____ 0.02% (weight/volume)
2 _____ 0.04% (weight/volume)
3 _____ 0.2 % (weight/volume)

In the following tests, the salicylamide and the suspending agent were triturated together in a mortar, and the sugar solution was added slowly with trituration.

Example:
4 _____ 1.0% (weight/volume)

Each was tested for stability, and each was found to be satisfactory; i.e., there was no separation of the salicylamide.

In a run comparable to Example 4, using 0.01% of the polyvinylpyrrolidone, the product was unstable; i.e., there was substantial separation of the salicylamide.

The above successful results are indeed surprising when one considers the many conventional suspending or wetting or the like agents which were tested and found to give mixtures which did not have satisfactory stability; i.e., mixtures in which the salicylamide separated out and floated on top, upon standing. These are typified by the following:

In the following tests, the salicylamide was mixed with the solution of suspending agent in a mortar and filtered. The filter cake was dispersed in the sugar solution.

Comparative test:  Concentration, percent (weight/volume)
A. Methylcellulose (Dow HG–4000) _____ 0.2
B. Pectin (LM) _____ 0.5
C. Egg albumin _____ 0.5
D. Isoelectric casein _____ 0.5

In the following tests, the salicylamide and the suspending agent were triturated together in a mortar, and the sugar solution was added slowly with trituration.

Comparative test:  Concentration, percent (weight/volume)
E. Sodium alginate _____ 0.5
F. Methylcellulose (Dow HG–50) _____ 0.5
G. Carboxymethylcellulose (low visc.) _____ 1.0
H. Purified magnesium aluminum silicate ___ 0.3
I. Purified magnesium aluminum silicate ___ 0.5
J. Purified magnesium aluminum silicate ___ 1.0
K. Ethyl alcohol _____ 3.5

In the following test, the salicylamide and the suspending agent were mixed in a mortar, then sufficient sugar solution was added to form a paste (about 1.5 parts by weight of solution per part of the powder), and the paste was run through a three-roll mill (Kent); then the remainder of the sugar solution was mixed therewith and the resulting mixture was passed through a colloid mill.

Comparative test:  Concentration, percent (weight/volume)
L. Carboxymethylcellulose (low visc.) _____ 0.5

In the following test, the wetting agent was dissolved in a portion of the sugar solution, and the resulting mixture was added slowly to the salicylamide with trituration in a glass mortar.

Comparative test:  Concentration, percent (weight/volume)
- M. Sodium alginate (extra low visc.) _____ 0.5
- N. Polyoxyethylene sorbitan trioleate (20 ethoxy units per molecule) _____ 0.2
- O. Polyoxyethylene sorbitan monolaurate (4 ethoxy units per molecule) _____ 0.2
- P. Polyoxyethylene sorbitan monolaurate (20 ethoxy units per molecule) _____ 0.2
- Q. Glycerin _____ 1.0

Comparable results to the foregoing Examples 1 through 4 may be obtained with various modifications thereof, including the following. The concentration of the salicylamide in the final composition may be in the range of 2 to 15 percent by weight, preferably 4 to 5 percent. The particle size of the salicylamide may be in the range of 0.1 to 100 microns, or above, desirably 2 to 25, and preferably 3 to 4 microns average diameter. The molecular weight of the polyvinylpyrrolidone may be in the range of about 20,000 to about 80,000, desirably 30,000 to 50,000, preferably 40,000, average. The concentration thereof in the final composition is at least about 0.02% weight/volume (i.e., 0.0149% by weight). The maximum concentration is the solubility limit thereof in the final composition; however, for practical purposes, one percent is the upper limit. Instead of the sucrose in the mixture, other sugars may be used, including hydrolyzed sucrose, glucose, fructose, or mixtures thereof. Various proportions of sugar or sugars may be used with sorbitol, providing the desired specific gravity is maintained.

If desired, there may be included in the mixture a small amount of sodium benzoate or the like preservative, as well as coloring or flavoring materials. These do not interfere with or cause any harmful effect on the stability of the resulting composition. It is desirable to use relatively ion-free water.

In making up the preparation, the sorbitol may be mixed with the water using an efficient propeller-type mixer and the sucrose added thereto, together with the sodium benzoate, if desired. The mixture may be heated, e.g., up to about 175 to 200° F., in order to obtain complete solution. The specific gravity of the resulting solution should be in the range of 1.335 to 1.340, and if necessary it be adjusted by adding either water or sugar.

The polyvinylpyrrolidone may be dissolved in water, using about 5 to 10 parts by weight of the water per part of the polyvinylpyrrolidone. The resulting polyvinylpyrrolidone solution may be mixed with a portion of the sugar solution, e.g., in the proportions of about 15 to 25 parts by weight of the sugar solution per part by weight of the polyvinylpyrrolidone solution, and these may be mixed with the salicylamide in an efficient mixer, preferably one provided with means for evacuating the mixing chamber. Preferably, the salicylamide is added thereto gradually with relatively slow agitation, in a proportion such as about 0.5 part by weight of salicylamide per part by weight of the liquid mixture therein. The resulting mixture is agitated at high speed. Then the mixing chamber is evacuated, without agitation. After the vacuum has been brought up to about 27 to 28 inches (or 130 to 50 mm.) of mercury, the agitation is started again, and the speed thereof gradually increased, and maintained at highest speed for a time to achieve thorough mixing, such as about ½ or 1 hour or more. Then the speed is gradually reduced, and finally the vacuum is decreased and the contents brought back to room pressure. If desired, a small amount of coloring matter and flavoring may be added thereto, e.g., as a solution in water. The resulting mixture may be added to additional syrup, if desired, to give a final composition of the desired salicylamide concentration, and this may be achieved by mixing thoroughly with a paddle or propeller type mixer, and finally by passing through a homogenizer, e.g., at about 300 to 600 p.s.i.g. (pounds per square inch gauge).

The product is pleasant tasting, and is especially useful for oral administration of salicylamide medication to children.

In view of the foregoing disclosures, variations or modifications thereof will be apparent, and it is intended to include within the invention all such variations and modifications except as do not come within the scope of the appended claims.

I claim:

1. A method for the preparation of stable aqueous suspension containing 2 to 15 percent by weight of finely divided solid salicylamide in an aqueous vehicle, which method comprises preparing a paste of the finely divided salicylamide in aqueous polyvinylpyrrolidone and thoroughly mixing said paste with an aqueous sugar solution having a specific gravity in the range of 1.335 to 1.340, the concentration of the polyvinylpyrrolidone being at least 0.0149% based on the weight of the final suspension.

2. A method of claim 1 wherein the polyvinylpyrrolidone is of an average molecular weight of about 40,000 and the sugar solution contains sucrose and sorbitol in a ratio of 3 parts of the former to 1 part of the latter by weight.

3. A stable aqueous suspension of finely divided salicylamide in an aqueous sugar solution, which solution has a specific gravity in the range of 1.335 to 1.340, which suspension contains 2 to 15 percent by weight of finely divided solid salicylamide and at least 0.0149% of polyvinylpyrrolidone based on the weight of the final suspension.

4. A suspension of claim 3 containing about 5% of the salicylamide.

References Cited in the file of this patent

UNITED STATES PATENTS 2,671,749  Schultz _____ Mar. 9, 1954

FOREIGN PATENTS 455,928  Canada _____ Apr. 12, 1949
680,788  Great Britain _____ Oct. 8, 1952
26,913  India _____ Mar. 21, 1940

OTHER REFERENCES

"Plasdone" PVP, Gen'l Aniline and Film Corp., New York, June 15, 1951 (22 pp.), pp. 8–9 and 17–19 pert.

Lesser: Drug and Cos. Ind., vol. 75, No. 1, July 1954, pp. 32–33 and 126–130 (reprint, 6 pp.).